(12) United States Patent
Song et al.

(10) Patent No.: US 12,484,934 B2
(45) Date of Patent: Dec. 2, 2025

(54) HEAD MOUNTED ROBOTIC SYSTEM AND METHOD

(71) Applicant: University of Central Florida Research Foundation, Inc., Orlando, FL (US)

(72) Inventors: Sang-Eun Song, Orlando, FL (US); Sakura Sikander, Orlando, FL (US); Pradipta Biswas, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 968 days.

(21) Appl. No.: 17/542,832

(22) Filed: Dec. 6, 2021

(65) Prior Publication Data

US 2022/0175422 A1 Jun. 9, 2022

Related U.S. Application Data

(60) Provisional application No. 63/122,464, filed on Dec. 7, 2020.

(51) Int. Cl.
*A61B 17/64* (2006.01)
*A61B 34/00* (2016.01)
*A61B 34/30* (2016.01)

(52) U.S. Cl.
CPC .......... *A61B 17/6433* (2013.01); *A61B 34/30* (2016.02); *A61B 34/74* (2016.02); *A61B 2034/742* (2016.02); *A61B 2034/744* (2016.02)

(58) Field of Classification Search
CPC ..... A61B 17/64; A61B 17/6433; A61B 34/30; A61B 34/74; A61B 34/00; A61B 17/66; A61B 17/663; A61B 90/14
See application file for complete search history.

(56) References Cited

U.S. PATENT DOCUMENTS

| 6,726,479 B2 | 4/2004 | Tremont |
| 2003/0138755 A1 | 7/2003 | Tremont |
| 2015/0238228 A1* | 8/2015 | Langenfeld ............ A61B 17/66 606/105 |

FOREIGN PATENT DOCUMENTS

| KR | 2011 0049417 A | 5/2011 |
| KR | 2020 0089488 A | 7/2020 |

OTHER PUBLICATIONS

Espacenet English-language Abstract for KR 2011 0049417 A, May 12, 2011.
Espacenet English-language Abstract for KR 2020 0089488 A, Jul. 27, 2020.
(Continued)

*Primary Examiner* — Christopher J Beccia
(74) *Attorney, Agent, or Firm* — Tiajoloff & Kelly LLP (57) ABSTRACT

A robotic device mounted on the head of a patient has a pivoted arm that extends down to support an article, such as a part of the jaw of the patient in orthognathic surgery. The pivoted arm is on a support plate that is in turn supported by a hexapod assembly that connects with a U-shaped bracket secured to the patient's head. The hexapod is computer controlled to adjust the position of the support plate relative to the head of the patient to precisely locate the supported article on the patient, such as where a separated portion of the patient's jaw is positioned for reattachment in orthognathic surgery.

22 Claims, 8 Drawing Sheets

(56) References Cited

OTHER PUBLICATIONS

Y. Kim et al., "Virtual Reality and Augmented Reality in Plastic Surgery: A Review" (Archives of Plastic Surgery 2017) Apr. 21, 2017.
S.-Y. Woo et al., "Development of a robot-assisted orthognathic surgery system integrated with image-guided navigation" (IEEE International Conference on Biomedical Robotics and Biomechatronics (BioRob) Singapore, Jun. 26-29, 2016.
X. Wang, et al., "System design for orthognathic aided robot," in 2015 IEEE International Conference on Cyber Technology in Automation, Control, and Intelligent Systems (Cyber), 2015, pp. 612-617, 10.1109/Cyber.2015.7288011, Jun. 8, 2015.
S.-Y. Woo et al., "Autonomous bone reposition around anatomical landmark for robot-assisted orthognathic surgery," J. Cranio-Maxillofacial Surg., vol. 45, No. 12, pp. 1980-1988, Sep. 19, 2017. https://doi.org/10.1016/j.jcms.2017.09.001.

\* cited by examiner

HEAD MOUNTED ROBOTIC SYSTEM AND METHOD

RELATED APPLICATIONS

This application claims the priority of U.S. provisional application Ser. No. 63/122,464 filed on Dec. 7, 2020.

FIELD OF THE INVENTION

The present invention relates to devices for supporting articles during surgery, and more particularly to robotic supports in those procedures.

BACKGROUND OF THE INVENTION

Surgical operations and other medical treatments may require systems to support articles during treatment.

One example is orthognathic surgery, commonly known as corrective jaw surgery, which is a surgical procedure performed to treat patients with severe facial jaw deformities. Corrective jaw surgery is performed to correct such conditions of facial deformities that are too severe for orthodontic camouflage.

In general, orthognathic surgery involves surgical procedures on the mandible and/or maxilla to reposition the jaws into their normalized or functional relationship in patients with dentofacial deformities. Reports indicate that approximately 5% of the adult population of the United States that suffers from dentofacial deformities, cannot be treated by orthodontic treatment only, and require surgery as a part of their definitive treatment. Surgical alteration to correct the facial disharmonies may produce a significant effect on the mechanical advantage of the jaw muscles. In other words, the correction of dentofacial deformities using combined orthodontic and surgical treatment can provide significant changes in the functional aspects of the face. Orthognathic surgery may also be required for children as well for a number of conditions.

The orthognathic surgical procedures may include maxillary or mandibular surgery, or both. Preoperative planning technologies provide virtual guidance for the surgery. Nevertheless, the success of a surgery depends on how precisely the surgeon can follow the preoperative positioning during the surgery.

Orthognathic surgery requires the surgeon to accurately reposition and fix the temporarily detached maxilla and mandible following the preoperative planning. Current procedure requires the surgeon to perform micro-actions during the surgery to accurately reposition and fix the maxilla and mandible following the preoperative planning, and, for a surgeon to perform a successful orthognathic surgery, micro actions are required to ensure precise positioning of the jawbones.

Manual positioning with manual tools limits the ability of precise positioning. Since human error limits precise manipulation, this may lead to differences between preoperative surgical planning and postsurgical outcome.

In order to improve surgical outcomes, robot-assisted surgery has been used in various disciplines, such as orthopedic, laparoscopy, neurosurgery, percutaneous surgeries. Technology related to pre-surgical planning, e.g., virtual planning software in orthognathic surgery, has greatly advanced with time. Nevertheless, presently, no robotic device has been used in practice for assisting in orthognathic surgery to bridge the gap from the virtual environment to the operating room.

A few research groups have investigated using a standard robotic arm to autonomously reposition the jawbones. Those robots are being utilized in the research environment, but they are usually bulky, and require larger space in the operating room, and also involve extensive device registration and tracking processes, i.e., localizing and tracking the target and the robot in the same spatial coordinate system. Additional setup is required in order to separately mount the robot arm on a particular station in the operating room. In addition to that, a patient's body needs to be immobilized by fixing it to the operating table or by tracking the target using optical tracking.

No robotic system exists that can be conveniently used in the context of operations such as orthognathic surgery to assist a surgeon in precisely repositioning the jawbone segments.

SUMMARY OF THE INVENTION

It is accordingly an object of the invention to provide a system and method that improves the outcome of surgical procedures such as orthognathic surgery by introducing a robotic guide system that can enhance surgical precision and complement a surgeon's free-hand expertise during the surgery.

To simplify the procedure and minimize localization and tracking errors, a compact robotic system is directly mounted on a patient's skull to assist the surgeon for successful orthognathic surgical outcome by precisely repositioning the jawbone during the surgical procedure. The skull mounted robotic device eliminates complex device-to-image registration steps and continuous tracking. In other words, the robotic system allows the robot coordinate system and the patient coordinate to remain constant throughout the surgical procedure after initial registration.

The robot holds the surgically mobilized jawbones and repositions them to a preoperatively defined location so the surgeon can fix them. The robot also repositions the jawbone per the surgeon's instructions during the intraoperative procedure if desired. A key purpose is to assist the surgeon to eliminate any possibility of human error while repositioning, thus reducing postoperative complications and possibility of re-surgery.

According to an aspect of the invention, a compact six-degrees-of-freedom robotic device is directly attached to the head of the orthognathic surgery patient. The head mounted robotic device stably holds the jawbone segments, and therefore provides positioning of the lower and upper jaw in a highly precise manner.

The robot end effector arm has a secure holding mechanism incorporated in it. The robot manipulator with head frame is firmly attached to the head of the patient and allows the end effector to reach to the desired position on the patient's face. Since the robot is mounted on the patient's head, the robot coordinate system and the patient coordinate system remain constant throughout the surgical procedure after initial registration. This eliminates the need for re-registration while operating on the patient.

The compact robotic device is directly mounted, as with screws or cranial pins well known in the surgical arts, on a patient's head to assist the surgeon and contribute to successful orthognathic surgical outcome by precisely repositioning the jawbone during the surgical procedure. This helps the surgeon eliminate human error while repositioning, and reduces postoperative complications and any possible need for re-surgery. The robot also is able to adjust the planned repositioning, per the surgeon's instructions, during the intraoperative procedure if required. Because the device is head mounted, it reduces the device-to-image registration during the intraoperative procedure.

From the procedural point of view, the robotic manipulator is installed on the head with a hinge-connected end-effector arm. The hinge connection feature allows the surgeon to access the maxillofacial and mandibular region without any interference from the arm while initially operating on the jawbone to temporarily separate the portion of the jawbone from the patient's skull.

After installation of the robot on the patient's head, the surgeon performs the required surgical tasks, which include osteotomy and bone grinding. While operating initially, the arm is retracted to avoid any interference with the surgical space. Then, the surgeon needs to hold the mobilized jawbone and reposition it into the desired location, and, to perform this task in a precisely controlled manner, the surgeon moves the end of the hinge-connected end effector arm down to get it attached to the jawbone.

A firm connection between the jaw and the end effector is enabled through a custom-made bracket, which is connected at the end of the arm with screw fixtures. This bracket has multiple screw holes to connect to one or both the jaws (i.e., to connect to the inferior transverse maxillary buttress and the superior transverse mandibular buttress) and the end effector and is firmly connected through screws or by some other attachment mechanism to the teeth of the patient on the jaw portion(s) being supported. This ensures the rigid connection to hold the jawbones in place. At this point, to connect the jawbone comfortably, the surgeon can manipulate the robot manually using a joystick or other control devices for comfortable placement of the arm end effector position if needed. Later the surgeon again can manipulate the robot to navigate the jaw to its desired preplanned position.

Once the jaw bones are screwed to the arm, since the arm is firmly attached with the movable platform, rigid connection between the moving platform and the arm is achieved.

To fix everything precisely in position on the head frame and robot platform, the arm and the support platform for the arm are connected by a mechanical positioning and aligning mechanism that locks the arm into a rigidly supported pre-determined position, such as where the hinged arm clicks or snaps into its down-position by a latching mechanism on the platform. This results in the arm and its end effector being in a predictable position relative to the platform, allowing operative control of the location of the end effector through the control of the position and orientation of the platform. This accelerates the fixation procedure without requiring any prior knowledge of the orientation of the mechanical components. Once they are installed in place, fasteners are used to rigidly fix them. This reduces the overall installation time of the device. The surgeons are able to navigate the robotic device using an input device, e.g., a joystick, connected with a computer system controlling the robot if they desire to reposition it.

In an embodiment of the invention, the hinge connection includes hinge pins that are releasably secured in the hinge so that the end-effector arm may be completely removed until it is needed, to provide as much clearance as possible in the area around the head of the patient during the parts of the surgery in which the arm is not in use.

Another objective of the robotic system is to have minimum weight while satisfying the structural requirements. Keeping that in consideration, the robot along with the head frame is designed to make it as lightweight as possible, and to occupy minimal space.

Another object of the robot design is to position and orient the end effector holding the portion of the patient's jawbone to a preoperatively defined precise location, and thereby hold the jawbones and lock itself in place. The robotic system includes a computer based controller that receives position and orientation information from the virtual pre-planning simulation software and based on which it performs the inverse kinematic calculation for positioning the end effector. The robotic system can position, for example, the separated jaw of the patient in the location determined during pre-operative planning for the final position of the jaw after the operation, to allow the surgeon to re-attach the jaw in that location. After the robot places the jaw(s) in the planned reattachment location, the surgeon may, if desired, make further adjustments of the placement of the end effector using a 3D mouse or joystick.

According to another aspect of the invention, a system for supporting an object during operation on a head of a patient comprises a mounting portion secured with screws or other fastening structure to the head of the patient. An adjustable support portion is supported on the mounting portion for adjusting movement with respect to it. A support arm is supported on the support portion and extends downward relative to the head of the patient. The support arm has an end effector that is secured to an article or a part of the patient so as to support the article or part in a stationary location relative to the head of the patient.

The mounting portion is mounted below a top of the head of the patient, and is generally U-shaped and extends around the head of the patient. The mounting portion has an open space rearward of the head of the patient such that a back portion of the head can rest on a surface under it. The mounting portion also has mounting structures extending downward from it that in use are screwed to sides of the head of the patient.

The adjustable support portion is supported above the top of the patient's head by an adjustable positioning mechanism. The adjustable positioning mechanism comprises a computer-controlled hexapod system comprising six adjustment members each connected with the mounting portion and the support portion with a ball joint and being each independently adjustable in length. The computer-controlled hexapod system includes an electronic computer that controls positioning of the support portion relative to the mounting portion responsive to input from a user using an input device, comprising, e.g., a mouse or a joystick.

The support arm has a rearward extending first portion pivotally connected to the mounting portion and a second portion extending downward from the first portion. The end effector is supported at a lower end of the second portion. The end effector comprises an attachment structure configured to secure the end effector to the part of the patient or the article being supported. A securing mechanism selectively locks pivoting of the arm member relative to the support portion so that the end effector is held substantially stationary relative to the head when so secured. When the securing mechanism is released, the arm member is free to pivot relative to the support member. The support arm preferably comprises two laterally spaced members each pivotally connected with the support member.

According to another aspect of the invention, a method of treating a patient comprises mounting a system as described above on the head of the patient, and then securing the end effector of the support arm in an operative supporting position near a part of the patient's head. The part or article is then connected to the end effector; and the joystick is then used to adjust the operative supporting position of the end effector through adjusting movement of the hexapod support system and the support portion to which the support arm is connected.

After the operation is completed, the next step of the method is separating the end effector from the part of article, and then the end effector is withdrawn from the operative supporting position by pivoting the support arm away from the head about the connection thereof to the support portion.

In the preferred embodiment, the part is part of a jaw of the patient that is held stationary relative to the patient's head during an orthognathic operation, and the end effector includes a bracket that is secured to the part during the orthognathic operation.

Other objects and advantages of the invention will become apparent from the specification herein.

DETAILED DESCRIPTION

Figure 1:
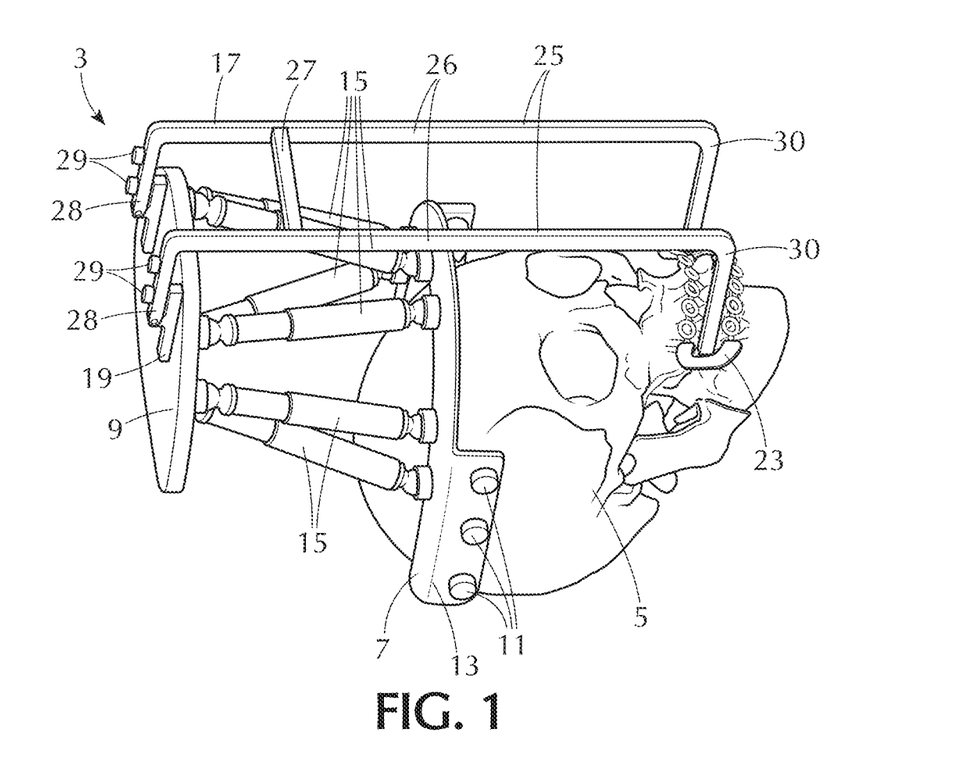
FIG. 1 is a perspective diagram showing a device according to the invention mounted on the patent's skull with the patient supine, and with the arm in the position of supporting the portion of the patient's jawbone.

FIG. 1 shows the head-mounted robotic device, generally indicated at 3, secured to the head or skull 5 of a patient that is lying supine, with the back of the patient's head supported on an operating table or other support structure, not shown.

The skull is shown as it would be positioned in the operating theatre in most common surgical practices. However, directional descriptions herein are generally made speaking relative to the head or skull of the patient, i.e., rearward meaning in the direction away from the face and upward meaning in the direction of the top of the head.

The head-mounted robotic device 3 comprises a fixed base frame or mounting portion 7, and a top movable platform or support portion 9.

The base frame 7 is firmly attached in engagement with the patient skull with surgical pins 11 that extend through a mounting flange 13 and into the skull. The three screw holes along each side flange 13 of the frame 7 rigidly attach the head frame 7 through sharpened sterile screw pins 11 to the patient's head, with structures that are well known in the surgical art. The rigid attachment ensures that the base coordinate frame 7 is fixed relative to the patient's head throughout the surgical procedure. The pins 11 also allow the adjustment of the head frame 7 when attached to the skull to fit different skull sizes by the use of screws to affix the head frame 7 to the skull of the patient when it is first fit in place.

Six non-back drivable prismatic actuators or adjustable legs 15 connect the base frame 7 and moving platform 9. Each of six actuators is connected to the top moving platform 9 and to the base frame by universal joints in parallel at both joint ends of each leg 15.

Each leg 15 is selectively extensible due to the prismatic joint. In other words, the legs are designed with an upper body and lower body with a linear motor that allows the length of each leg to be varied independently by an electronic control system, usually an operator controlled computer system. The upper body is connected with the universal joint attached to the support plate 9, and the lower body is connected with the universal joint attached to the mounting plate 7. The actuator legs 15 form symmetry about the mid-sagittal plane but are not symmetrically distributed about the coronal plane. Thus, the position and orientation of the moving platform 9 can be modified by adjusting the six legs 15. The robotic device selectively positions the top platform 9 in three translational (lateral, longitudinal, vertical) degrees of freedom and three rotational (roll, pitch, yaw) degrees of freedom-therefore in total six degrees of freedom relative to the mounting portion 7 of the device 3.

The six adjustable legs 15 are preferably members of a robotic hexapod arrangement, and hexapod systems of this sort are well known in the robotics art. By virtue of the universal ball-and-socket connections and of the legs each being adjustable in length by its electric motor with a linear high gear ratio, the hexapod arrangement can move the moving platform 9 in the six degrees of freedom, The adjustment precision afforded by the system is high enough to make adjustments of less than a millimeter in the lengths of the arms 15. The legs 15 are non-back drive actuators that are configured to lock the assembly when power is not supplied to it, maintaining the current angle, tilt, and position of the support member 9 relative to the mounting portion 7.

An end effector arm 17 is connected with a hinge joint 19 to the top moving platform 9. The arm 17 is preferably formed of two laterally spaced bracket members 25 reinforced for rigidity by a cross beam 27 extending therebetween. Each of the bracket members 25 is generally U-shaped, with a middle portion 26 extending vertically relative to the skull, and top and bottom portions 28 and 30. The top portions 28 are each attached by a respective portion of the hinge joint 19 to the top moving platform 9.

Arm 17 in use during the operation is secured to extend downward over the face of the patient to its lower end where bottom portions 30 extend rearward toward the patient's face and support an appropriate support attachment or end effector 23.

When in the position shown in FIG. 1, the arm 17 is rigidly or fixedly secured in the rotated down position by one or multiple securement bolts 29 that screw through the bracket members and into the plate member 9. When the bolts are removed, the arm 17 is released to pivot about the hinge 19. Other types of securement may be employed instead of, or in addition to bolts, including a releasable latching structure that clicks into locked condition when the arm 17 is moved to the support position of FIG. 1, and can be released manually when desired.

Figure 3:
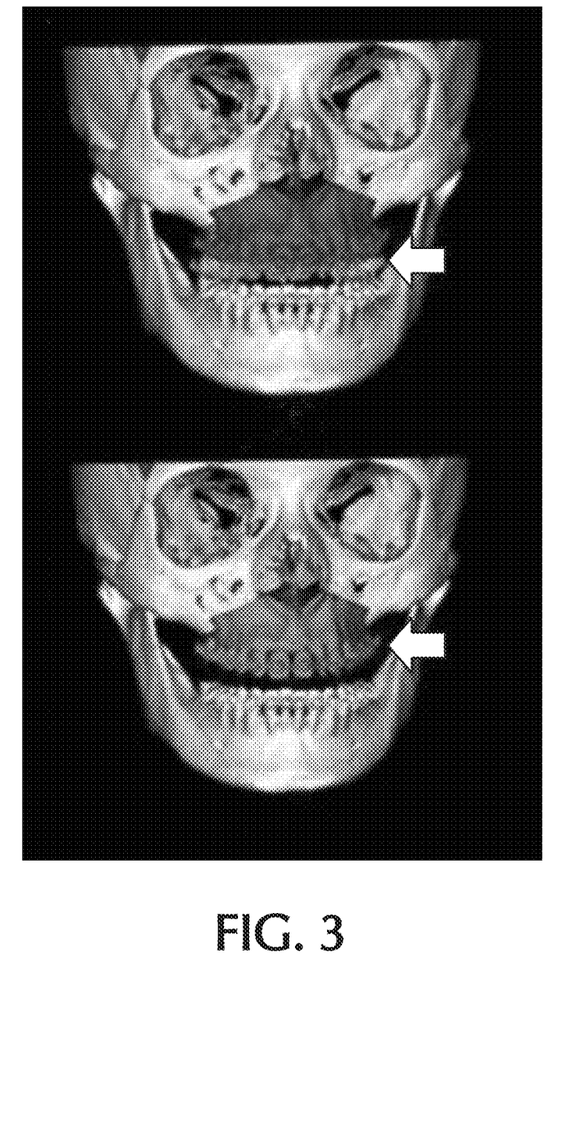
FIG. 3 is a diagram showing a portion of the jawbone of the patient that may be moved and supported by the robotic device of the invention.

In orthognathic surgery, the attachment structure is a bracket configured for attachment to a portion of the jaw of the patient. That jaw portion is shown in FIG. 3, in which the highlighted portion is removed from the upper jaw, trimmed appropriately, and then reattached in a different position. During reattachment, the jaw portion must be held stationary, and that is accomplished by the bracket attachment structure 23 being affixed to the jaw portion with screws. Once attached, the exact position of the jaw portion is set by the surgeon using a computer-controlled adjustment of the adjusting legs 15, which move the support platform 9 and with it the arm 17 and the bracket 23.

It will be understood that the attachment structure 23 may be alternatively configured to support a different part of the body or a different article, such as a tool, for a different type of operation that relies on precisely locating the article on the head of a patient.

Figure 2:
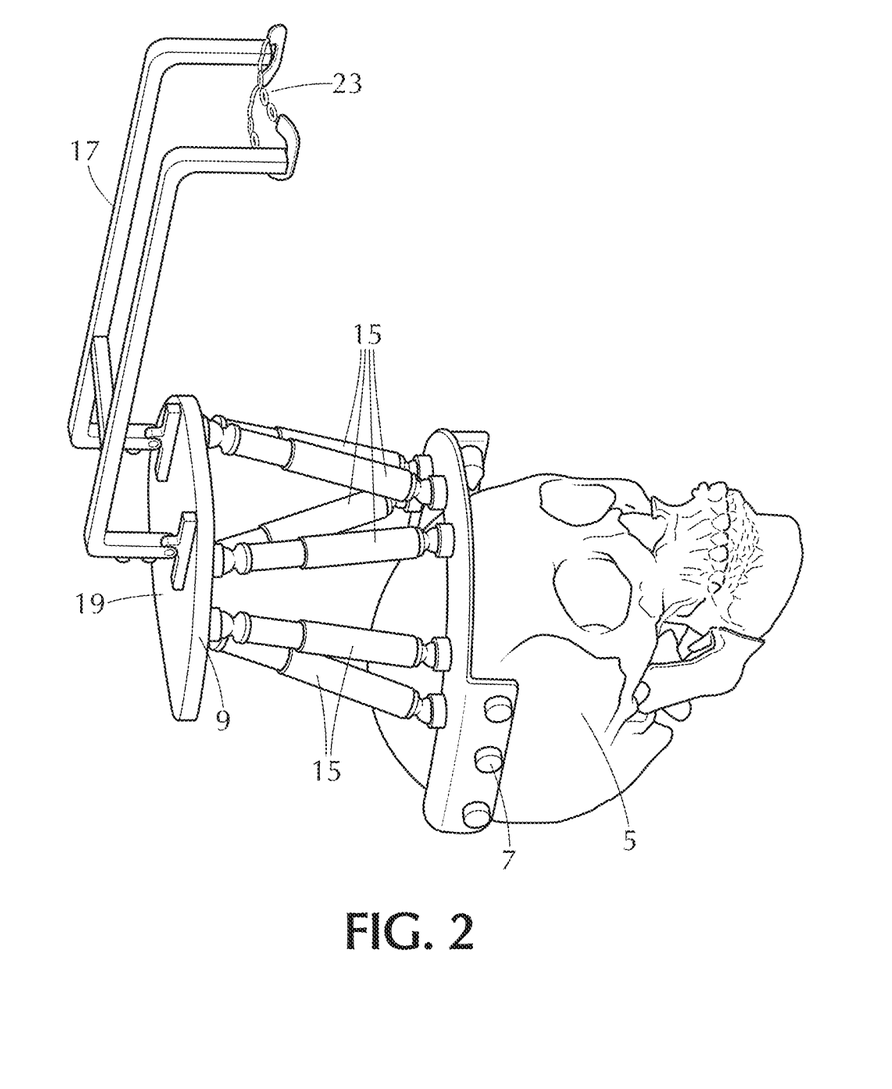
FIG. 2 is a perspective diagram as in FIG. 1, but showing the arm hinged and rotated away from the face of the patient to provide a clearance space over the face of the patient for access during surgery.

Referring to FIG. 2, when support is not required, the arm 17 may be rotated up away from the face of the patient. In this retracted position, the device 3 provides clearance for access to the patient's face, with the end effector arm 17 lifted while not in operation to make space for the surgeons to operate around the facial area.

For sterilization, the head frame 7 and end effector arm 17 are sterilizable while all the other components of the device 3 are covered with sterile surgical cover, not shown.

Figure 4:
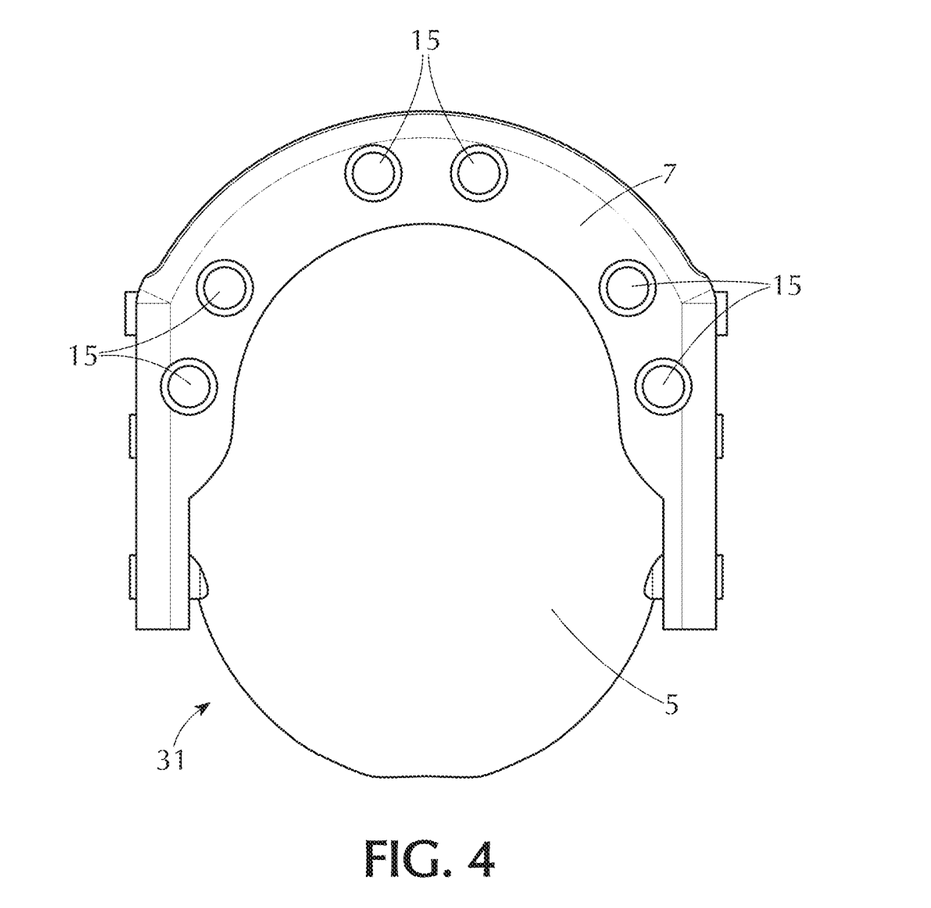
FIG. 4 is a plan view showing the top of the skull of the patient with the base platform of the robotic device attached to it.

FIG. 4 shows a top view of the mounting portion 7 that is attached to the patient's skull. The head frame or mounting portion 7 includes a generally U-shaped plate that extends around the head of the patient. The head frame is designed to fit the average human head. During the surgery, the patient is in the supine position, and to allow the patient to rest in that position without any interruption, the frame 7 is half-moon/semi-round shaped to provide an opening 31 in the back side of the head frame 7.

In addition, the lower ends of the actuator legs 15 are connected as shown in FIG. 4. The legs or actuators are a hexapod, but it is not a traditional hexapod, which usually maintains a sort of symmetry of the actuators. The six actuators in the hexapod of the robotic system are arranged in an asymmetrical manner. The actuators are symmetrical about the midsagittal plane, i.e., left-right symmetry relative to the patient, but the actuators are not symmetrically distributed about the coronal plane, i.e., there is front-back asymmetry relative to the patient, and the rear actuators are displaced forward from the rear of the skull. The actuators are arranged in this manner to provide more space around the posterior part of the head so that the patient head can be rested on the patient bed while performing surgery. This is important because the surgical procedure is performed in a supine position. Thus, the position and orientation of the moving platform can be modified by adjusting the six legs.

Kinematic software that enables a computer to control movement of hexapods is readily available from companies in the developed hexapod art, and with minor adjustment may be configured to accurately control the somewhat differently arranged hexapod legs 15 of the robotic system here described so as to position the platform 9.

Generally, the connections are toward the front end of the head base frame 7 since they are used for positioning the arm 17 and the connected structure 23 over the patient's face. This placement also provides rearward clearance space that allows the posterior side of the patient head to be free and able to be rested on the surgical bed. Also, this design allows minimal and consequently optimal space to be occupied by the actuators 15.

Figure 5:
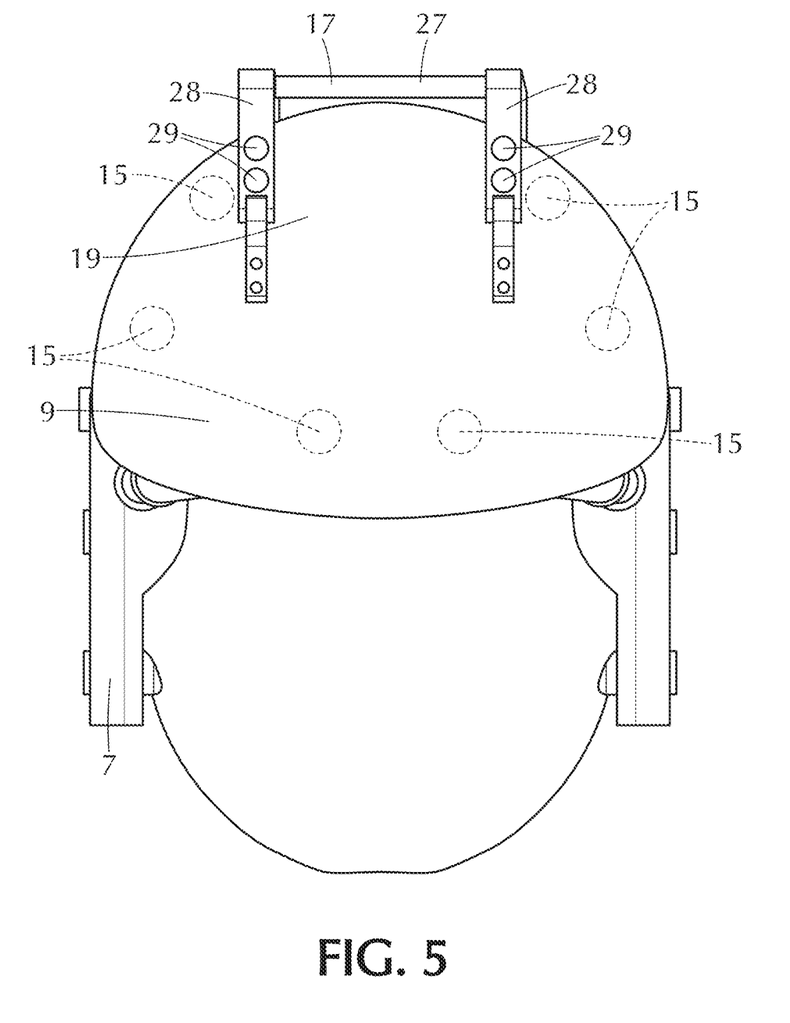
FIG. 5 is a plan view of the upper moving plate of the robotic device.
Figure 7:
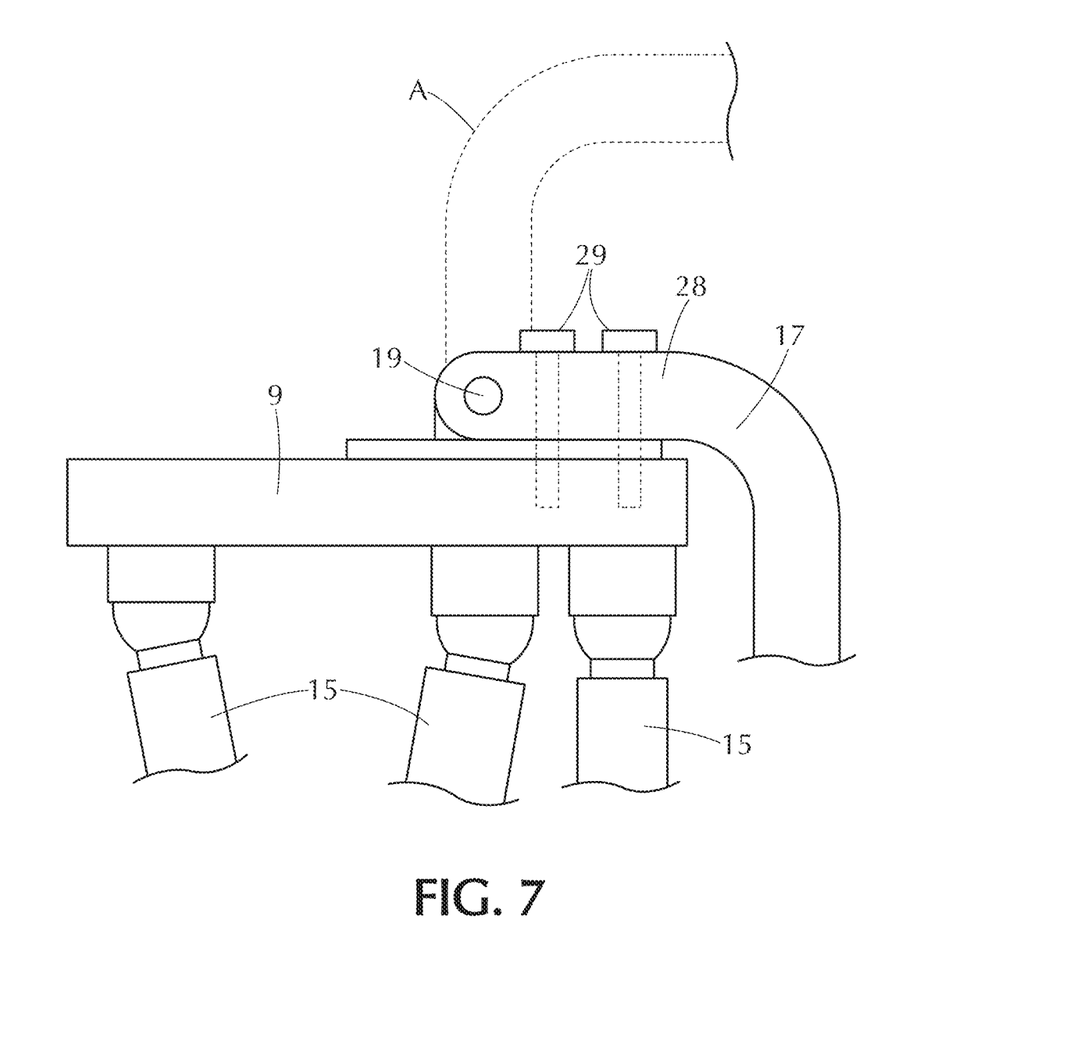
FIG. 7 is a side view if the upper moving plate of the robotic device, showing the hinged arm in the supporting and retracted positions.

Referring to FIGS. 5 and 7, the hinged connection of the support member 9 to the arm 17 is shown with the arm 17 secured in the downward extending support position. Hinge 19 is pivotably connected with the top portion 28. It is secured in this position by bolts 29 that extend through top portion 28 of arm 17 and are threadingly secured in bores in support platform plate 9. In this condition, the arm 17, and with it the end effector 23 supporting the jaw portion or other object, is held rigidly fixed relative to the plate 9. The position of the end effector can be moved by controlling and adjusting the lengths of the arms 15 moving and/or tilting the plate 9 relative to the mounting portion 7.

When the bolts 29 removed, as best shown in FIG. 7, the arm 17 can rotate on hinge pin 19 to position A. Position A corresponds to the position of arm 17 shown in FIG. 2, where the arm 17 is retracted to provide full access to the operational area of the patient's face.

Figure 6:
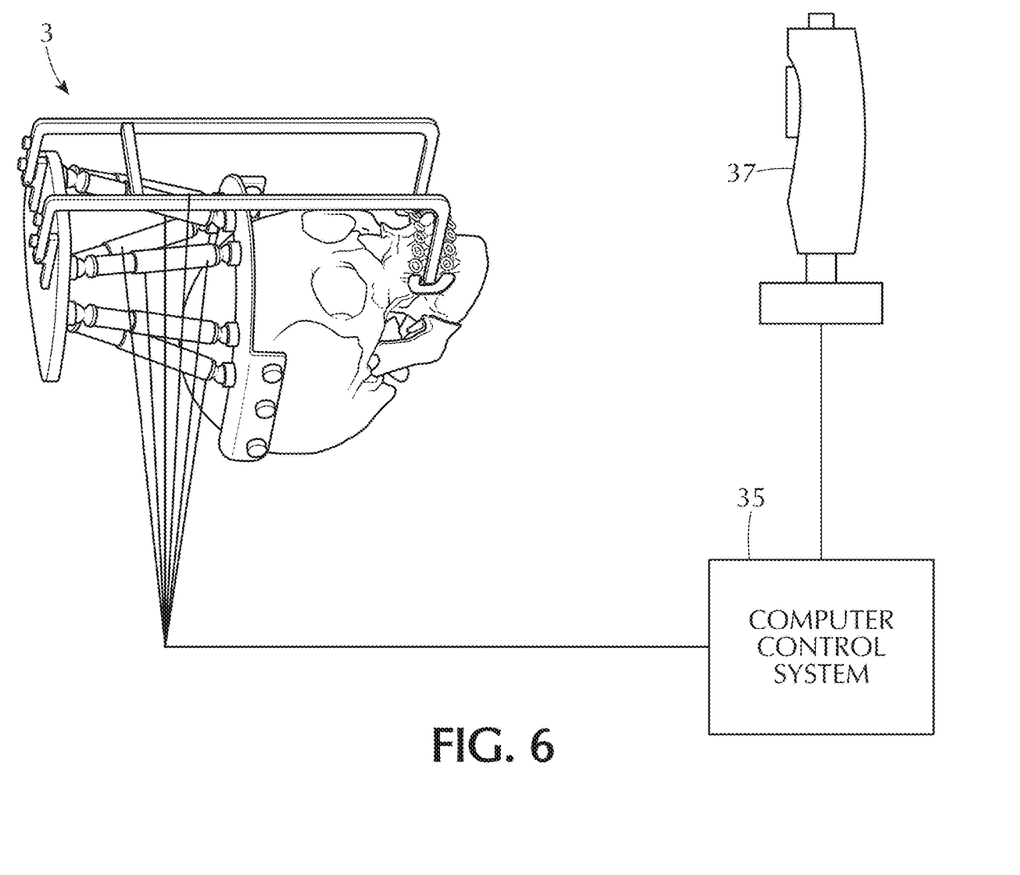
FIG. 6 is a diagram of the robotic device and supportive computer system.

The hexapod arms 15 are each connected with a computer control system 35, as illustrated in FIG. 6. The computer system 35 runs software that allows for controlling the position and angulation of the plate 9 based on input from joystick 37. Alternatively, a different input device, such as a space mouse, or even a regular two-dimensional mouse, may be used to control the hexapod system and adjust the position of the plate 9 and the arm 17.

In an orthognathic operation, the patient is first given a CT scan or other imaging scan to determine the bone structure of the patient's skull and jaw that generates computer-accessible data defining that bone structure. A computer system running pre-operative software that is well-known in the art creates a three-dimensional computer model of the patient's skull.

The surgeon then interacts with the pre-operative computer system, which may be the same system as the one that controls the robotic device 3, and, using the 3D model, determines the portion of the patient's jaw that is to be separated and possibly cut down in size, and also determines a replacement location in the model for the reattachment of that jaw portion. If the pre-operative computer system is a different computer, then data defining the replacement location is provided to the computer system and robot control software that controls the movement of the robotic support system.

At the time of the operation, the robot control system is fixedly mounted onto the head of the patient as seen in FIG. 2. At that point, the computer system performs a registration of the robotic system wherein the actual location of the mounting portion 7 and the platform 9 relative to the head of the patient is determined using registration methods well known in the art, e.g., ultrasound sensors of registration of points on the head with the mounting portion 7 or platform 9. The actual location of the robotic system is then combined with the defined replacement location of the end effector to derive a target position of the platform 9 relative to the mounting portion 7 that corresponds to the end effector holding the jaw portion in the replacement location.

The surgeon then starts the actual operation with the arm 17 retracted as shown in FIG. 2. In this arrangement, the surgeon has access to the patient's jaw, and with the arm 17 retracted separates out the jaw portion to be correctively moved, as in FIG. 3.

Once the jaw portion is separated, the robotic positioning is required, and the arm is manually rotated down and secured, as by bolts 29, so that the arm remains rigidly attached with the support plate 9. This ensures zero relative motion between the moving plate 9 and the arm 17.

The jaw portion, although separated partially from the patient's head so as to be movable, is still attached to the patient by some blood vessels, nerves, and other connecting tissue. The end effector 23 when rotated down and locked is in a position for attachment to the jaw portion, or, if not, the surgeon uses the joystick or mouse to cause the robotic support arms 15 to move the end effector 23 to a position where the splint can be attached to the jaw portion. End effector 23 is then attached to the jaw portion, usually by an attachment to the teeth or by screws.

Once the jaw portion is secured to the end effector or splint 23, the robot control computer system then causes the robot, by electronic commands to the hexapod legs 15, to move the platform to the position wherein the arm 17 affixed to it holds the end effector 23 and the attached jaw portion in the replacement position, where it is to be reattached to the skull of the patient. The surgeon can at that time assess whether the position of the jaw portion is appropriate for reattachment. If not, then the surgeon uses the input device 37 to also cause the computer system 35 to adjust the hexapod actuator legs 15 to move the upper plate 9 in adjusting movement, which moves the arm 17 attached to it, and the end effector 23 with the attached jaw portion with it. The surgeon continues this adjusting movement until the jaw portion is in place appropriate for reattachment to the patient's jaw in a corrected final position, as illustrated in FIG. 3. Once in this final reattachment position, the end effector 23 is held firmly to resist movement under the influence of any external forces. To aid in that, non-back-drivable linear actuators are incorporated in the hexapod actuator legs 15.

When the jaw portion has been reattached to the patient's jaw, the screws or other attachment apparatus securing the end effector to the jaw portion are removed. Bolts 29 are then unscrewed and removed, and the arm 17 then is rotated away from the patient's face, and returned to retracted position A shown in FIG. 7 or FIG. 2, where the robotic arm 17 may latch in the withdrawn position.

It may be understood that the robotic system disclosed herein may be used for other surgical or dental procedures other than orthognathic ones. Similarly, a robotic system of this sort may be applied analogously to surgery on other parts of a patient's body where precisely positioned support is required, such as, for example, brain surgery.

In addition, the end effector may be configured for something other than holding a part of the patient's body, such as being a holder for a tool or other article.

Alternatively, the arm may be mounted individually and separately, so that it is not continuously attached to the mounting plate, but supplied when needed, so that it is removed from the support plate and the surgical space in addition to being merely pivoted out of the way.

Figure 8:
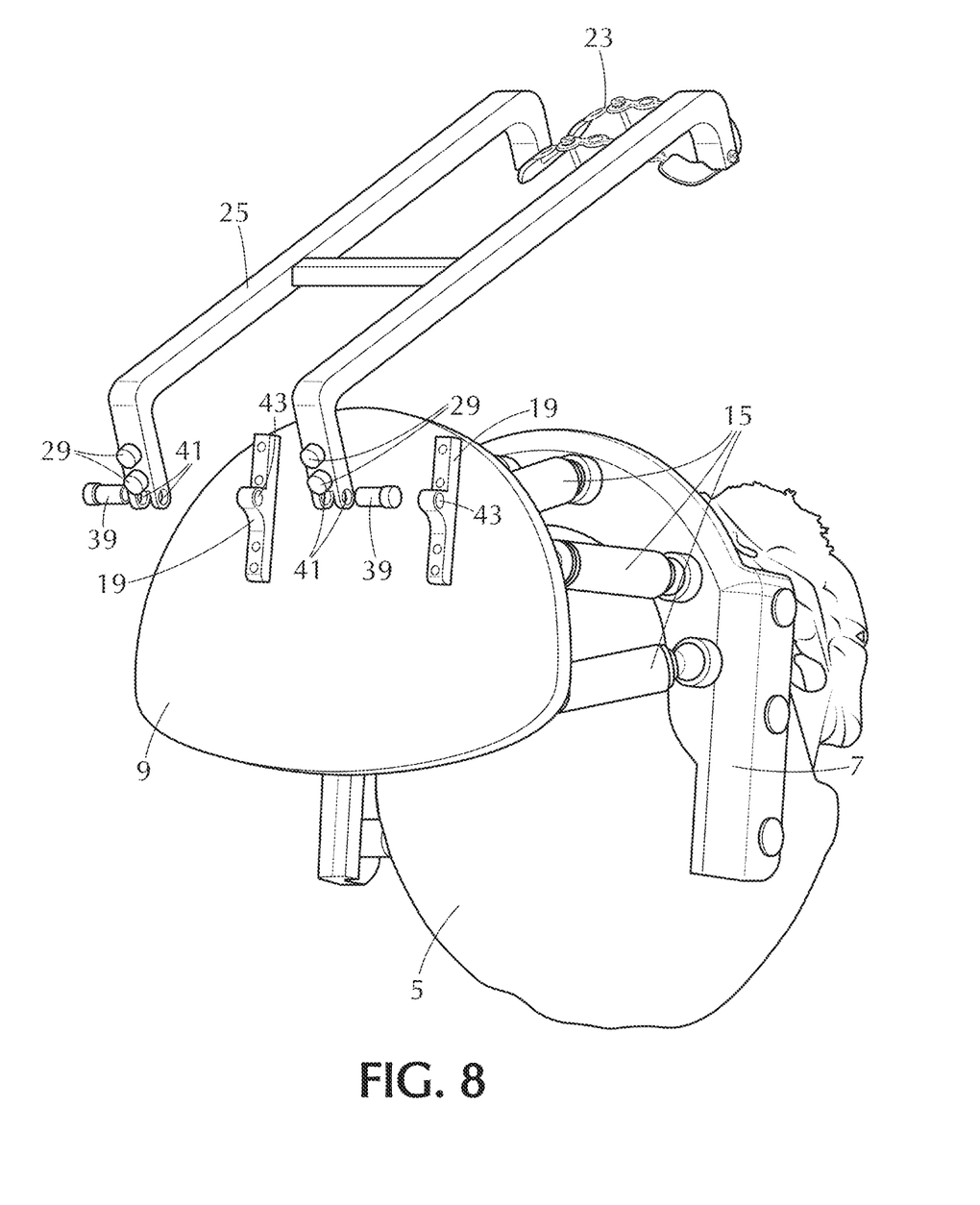
FIG. 8 is an exploded perspective view of the robotic device where the hinge pins and the arm are removable from the base platform.

This may be accomplished as shown in FIG. 8, which shows the structure that allows the surgeons, once they are comfortable introducing the arm in the surgical area with the face bracket, to introduce the arm to the device by fitting the in engagement with the hinge structures 19, and then inserting and then fastening pins 39 so that they each extend through respective sets of apertures 41 in the arm 25, as well as through respective apertures 43 in the hinge structures 19. The pins 39 may be secured by, e.g., threaded screw connections or by any of various other types of connection, such as quick release structures well known in the mechanical arts. When so fastened, the pins 39 allow the arm to swivel, and then, when the arm is lowered over the patient's face with the end-effector positioned in the surgical area and the surgeons feel the arm is in proper place relative to the jaw, the surgeons can fasten the bolts 29 to fixedly secure the arm rigidly relative to the top plate.

This arrangement provides several advantages. Where the arm is pre-mounted on the top plate, the extended arm length, even though pivoted away from the patient's face, could interfere with the surgeon's movement around the back of the head of the patient while in supine position, and restrict the movement of the surgeon around the head. The provision of the release structure that permits introducing the arm at a time of the surgeon's choice eliminates this situation during the surgery. When the surgeon decides to mount the arm on the plate, the arm is not extended outwards or upwards, but rather is placed with the face bracket on the patient's face side near the jaw.

Because the arm is U shaped, the bottom extension of the arm 25 might possibly interfere with the surgical area or come in contact with the anatomical region of the patient's face if it were mounted directly over the patient's face vertically, without the hinge mount allowing pivoting during the attachment of the arm. The presence of the releasable hinge connection with pins 39 provides for swiveling the arm about the top plate (i.e. the hinge structure 19), which avoids this situation while mounting the arm onto the support plate 9.

In addition, the detachable arm structure provides for the installation and use of different sizes of arm or different arm shapes if desired, even during a surgery, and ensures that, with the actuators, the surgeon can maximize the use of available workspace.

Having minimum weight while providing robust and precise support for the end effector is also a consideration in the robotic system here, and it is expected that the weight of the system should be comparable to skull mounted frames already in existence. To minimize weight and provide appropriate strength, the skull frame member 9 in the preferred embodiment is of titanium alloy, as is the arm 25 itself. The rest of the parts of the system are of aluminum alloy. The titanium alloy is lightweight but has high strength that minimizes bending when holding the jaw of a patient during orthognathic surgery and absolving tensions while fixing. Portions of the parts may be cut out to further reduce weight, and the robotic device preferably weighs less than 2 kg.

The terms used herein should be read as terms of description rather than of limitation. While embodiments of the invention have here been described, persons skilled in this art will appreciate changes and modifications that may be made to those embodiments without departing from the spirit of the invention, the scope of which is set out in the claims.

What is claimed is:

1. A system for supporting an object during operation on a head of a patient, said system comprising:
   a mounting portion configured to be secured on the head of the patient;
   an adjustable support portion supported on the mounting portion for adjusting movement with respect thereto; and
   wherein the support portion is supported on the mounting portion such that the support portion is located upward above the head of the patient when the mounting portion is secured to the head of the patient;
   a support arm supported on the support portion and extending downward therefrom relative to the head of the patient;
   said support arm having a portion distal to the support portion configured to be secured to the object; and
   control electronics controlling the adjusting movement of the adjustable support portion such that a user can cause the support portion to move with the support arm so that the object supported thereby is held fixedly in a selected location on the head of the patient.

2. The system of claim 1, wherein the support arm is configured to be attached to the object where the object is a part of a jaw of the patient; and wherein the support arm has an end effector that comprises an attachment structure configured to secure the end effector to said part of the jaw of the patient so that said part of the jaw of the patient is supported on the arm.

3. The system of claim 1, wherein the adjustable support portion includes an adjustable positioning mechanism supported on the mounting portion and a support plate supported on said adjustable positioning mechanism, and wherein the support arm is supported on the support plate, and said adjusting movement includes rotation about three orthogonal axes and displacement in three dimensions.

4. A system for supporting an object during operation on a head of a patient, said system comprising:

a mounting portion configured to be secured on the head of the patient;

an adjustable support portion supported on the mounting portion for adjusting movement with respect thereto; and a support arm supported fixedly on the support portion and extending downward relative to the head of the patient;

said support arm having a portion distal to the support portion configured to be secured to the object; and control electronics controlling the adjusting movement of the adjustable support portion such that a user can cause the support portion to move with the support arm so that the object supported thereby is held fixedly in a selected location on the head of the patient;

wherein the adjustable support portion includes an adjustable positioning mechanism supported on the mounting portion and a support plate supported on said adjustable positioning mechanism, and wherein the support arm is supported on the support plate, and said adjusting movement includes rotation about three orthogonal axes and displacement in three dimensions; and wherein the adjustable positioning mechanism comprises a computer-controlled hexapod system having six adjustment members each having an end connected with the mounting portion and an opposing end connected with the support plate, said adjustment members being each independently adjustable in length.

5. The system of claim 4, wherein the computer-controlled hexapod system includes an electronic computer that controls positioning of the support plate relative to the mounting portion responsive to input from the user using an input device, comprising a mouse or a joystick.

6. The system of claim 4, wherein the mounting portion is generally U-shaped and configured to extend around the head of the patient, said mounting portion having an open space rearward of the head of the patient such that a back portion of the head can rest on a surface therebelow.

7. The system of claim 1, wherein said mounting portion has mounting structures extending downward therefrom that are configured to be affixed to sides of the head of the patient.

8. The system of claim 1, wherein the support arm is selectively releasable from the support portion so as to permit removal of the support arm from the system by the user.

9. The system of claim 1, wherein the support arm has a generally U-shaped configuration defining an open inward space facing the head of the patient in the support position.

10. The system of claim 1, wherein the support arm includes a first portion having a pivotal connection to the support portion supporting the first portion in pivoting movement relative thereto, said first portion extending forward therefrom;

a second portion extending downward from the first portion in front of the head of the patient in said support position.

11. The system of claim 10, wherein the pivotal connection has removable hinge components that when removed permit separation of the support arm from the support portion.

12. The system of claim 10, and further comprising a securing mechanism that selectively locks the support arm against pivoting relative to the support portion so that the support arm and supported object are held substantially stationary relative to the head when so secured;

the support arm being free to pivot relative to the support portion when the securing mechanism is released.

13. The system of claim 1, wherein the support arm comprises two laterally spaced members each pivotally connected with the support portion and extending downward to the distal end of the support arm and supporting an end-effector connected with the object therebetween.

14. A method of treating a patient, said method comprising:

securing a mounting portion to the head of the patient, said mounting portion having an adjustable support structure supporting a support portion in an adjustable fixed position and orientation above the head of the patient;

securing a support arm so as to be connected with respect to the support portion, said support arm extending downwardly from above the head of the patient from the support portion;

a lower portion of the support arm having an end effector configured to attach to and support an object;

attaching the object to the end effector; and causing adjusting movement of the support portion relative to the mounting portion so as to move the mounting portion and the support arm so as to move the end effector to an operative supporting position fixedly supporting the object in a desired position and orientation relative to the head of the patient; and retracting the support arm from the operative supporting position by pivoting the support arm relative to the support portion about a pivot axis above the head of the patient to a retracted position wherein the support arm extends away from the head of the patient from the support portion above the head of the patient.

15. A method of treating a patient, said method comprising:

securing a mounting portion to the head of the patient, said mounting portion having an adjustable support structure supporting a support portion in an adjustable fixed position and orientation;

securing a support arm so as to be connected with respect to the support portion, said support arm extending downwardly of the head of the patient from the support portion;

a lower portion of the support arm having an end effector configured to attach to and support an object;

attaching the object to the end effector; and causing adjusting movement of the support portion relative to the mounting portion so as to move the mounting portion and the support arm so as to move the end effector to an operative supporting position fixedly supporting the object in a desired position and orientation relative to the head of the patient;

wherein the wherein the adjustable support portion includes an adjustable positioning mechanism supported on the mounting portion and a support plate supported on said adjustable positioning mechanism, and wherein the support arm is supported on the support plate;

the adjustable positioning mechanism comprising a computer-controlled hexapod system having six adjustment members each having an end connected with the mounting portion and an opposing end connected with the support plate, said adjustment members being each independently adjustable in length; and wherein said causing of adjusting movement comprises using an input device to interact via a computer with the computer-controlled hexapod system so as to adjust the operative supporting position of the end effector through adjusting movement of the hexapod support system and the support portion to which the support arm is connected.

16. The method of claim 15, and further comprising separating the end effector from the object; and withdrawing the end effector from the operative supporting position after said separation.

17. The method of claim 16, wherein the withdrawing of the support arm is by pivoting the support arm about a pivoting hinge connection thereof to the support portion.

18. The method of claim 16, wherein the part is part of a jaw of the patient that is held stationary relative to the patient's head during an orthognathic operation, and the end effector includes a bracket that is secured to the part during the orthognathic operation.

19. The method of claim 18, wherein the part of the jaw is partially separated from the head of the patient prior to the attaching to the end effector, and the part of the jaw is re-attached to the head of the patient so as to be supported thereby prior to said separating from the end effector.

20. The method of claim 14, wherein said securing of the support arm includes connecting the support arm to the support portion after said securing of the mounting portion to the head of the patient, said connecting including securement of the support arm to the support portion including assembling a hinge structure therebetween.

21. The system of claim 1, and the support arm being pivotally supported on the support portion about a pivot axis above the head of the patient such that said support arm is pivotable between a support position wherein the support arm is configured to support the object in the selected location, and a retracted position in which the support arm extends away from the head of the patient from the pivot axis above the head of the patient.

22. The system of claim 1, wherein the support portion is supported on the mounting portion by structure that provides for the adjusting movement thereof and of the mounting portion in all three dimensions relative to the head of the patient.

* * * * *